(12) United States Patent
Stein et al.

(10) Patent No.: US 10,807,651 B2
(45) Date of Patent: Oct. 20, 2020

(54) MOTOR VEHICLE

(71) Applicant: Bayerische Motoren Werke Aktiengesellschaft, Munich (DE)

(72) Inventors: Michael Stein, Roehrmoos (DE); Ralf Kiesmueller, Munich (DE); Tanja Watzek, Wartenberg (DE); Michael Floer, Munich (DE)

(73) Assignee: Bayerischeb Motoren Werke Aktiengesellschaft, Munich (DE)

( * ) Notice: Subject to any disclaimer, the term of this patent is extended or adjusted under 35 U.S.C. 154(b) by 107 days.

(21) Appl. No.: 16/131,262

(22) Filed: Sep. 14, 2018

(65) Prior Publication Data

US 2019/0009836 A1 Jan. 10, 2019

Related U.S. Application Data

(63) Continuation of application No. PCT/EP2017/055780, filed on Mar. 13, 2017.

(30) Foreign Application Priority Data

Mar. 16, 2016 (DE) .................. 10 2016 204 333

(51) Int. Cl.
*B62D 29/00* (2006.01)
*B62D 27/02* (2006.01)
(Continued)

(52) U.S. Cl.
CPC ............ *B62D 27/023* (2013.01); *B60R 22/24* (2013.01); *B62D 25/025* (2013.01); *B62D 25/04* (2013.01)

(58) Field of Classification Search
CPC .... B62D 27/023; B62D 25/025; B62D 25/04; B60R 22/24; B60D 27/023; B60D 25/025
See application file for complete search history.

(56) References Cited

U.S. PATENT DOCUMENTS 6,474,726 B1* 11/2002 Hanakawa ............. B62D 25/04
296/187.12
2008/0036235 A1* 2/2008 Ameloot ................ B62D 25/04
296/102
(Continued)

FOREIGN PATENT DOCUMENTS

CN 103813954 A 5/2014
CN 103879456 A 6/2014
(Continued)

OTHER PUBLICATIONS

International Search Report (PCT/ISA/210) issued in PCT Application No. PCT/EP2017/055780 dated Jul. 12, 2017 with English translation (four (4) pages).
(Continued)

*Primary Examiner* — Lori L Lyjak
(74) *Attorney, Agent, or Firm* — Crowell & Moring LLP

(57) ABSTRACT

A motor vehicle, in which a fastening of a lower end section of a car body pillar to a side skirt is simplified in that the through-opening of the inner profile of the car body pillar for guiding the belt strap is closed at the end portion pointing of the through-opening to the inner profile of the sill by way of a fastening portion, and a left side portion and a right side portion adjoining the fastening portion. The three portions are fastened to a flange portion of the inner profile of the sill and form a covering surface from two sheet-metal portions connected to one another.

8 Claims, 3 Drawing Sheets

(51) Int. Cl.
    *B62D 25/02*     (2006.01)
    *B62D 25/04*     (2006.01)
    *B60R 22/24*     (2006.01)

(56)              References Cited

U.S. PATENT DOCUMENTS

| | | | |
|---|---|---|---|
| 2008/0315628 A1* | 12/2008 | Obayashi | B62D 25/04 |
| | | | 296/193.06 |
| 2010/0244492 A1 | 9/2010 | Itakura | |
| 2013/0187406 A1* | 7/2013 | Torii | B62D 25/025 |
| | | | 296/187.12 |

FOREIGN PATENT DOCUMENTS

| | | |
|---|---|---|
| DE | 10 2013 225 661 A | 6/2014 |
| EP | 2 749 480 A1 | 7/2014 |
| JP | 11-189129 A | 7/1999 |
| JP | 2009-173170 A | 8/2009 |
| JP | 2015-89792 A | 5/2015 |

OTHER PUBLICATIONS

German-language Written Opinion (PCT/ISA/237) issued in PCT Application No. PCT/EP2017/055780 dated Jul. 12, 2017 (five (5)pages).

German-language Search Report issued in counterpart German Application No. 102016204333.1 dated Dec. 1, 2016 with partial English translation (twelve (12) pages).

Chinese Office Action Issued in Chinese application No. 201780016996.7 dated May 7, 2020 (Seven (7) pages).

\* cited by examiner

MOTOR VEHICLE

CROSS REFERENCE TO RELATED APPLICATIONS

This application is a continuation of PCT International Application No. PCT/EP2017/055780, filed Mar. 13, 2017, which claims priority under 35 U.S.C. § 119 from German Patent Application No. 10 2016 204 333.1, filed Mar. 16, 2016, the entire disclosures of which are herein expressly incorporated by reference.

BACKGROUND AND SUMMARY OF THE INVENTION

The invention relates to a motor vehicle with a body which has a passenger cell with laterally arranged body pillars, wherein the respective body pillars are connected to one another at their respective lower end region via a sill which is designed as a longitudinal member.

It is already known that a motor vehicle has a body with a passenger cell. The passenger cell has opposite side walls which are spaced apart from one another. Door cutout openings are formed in the side walls. The door cutout openings are delimited in the vertical direction by body pillars which are spaced apart from one another. The existing body pillars are connected to one another at their lower end portions by a side sill which is designed as a longitudinal member and at their upper end portions by a roof frame portion which extends in the vehicle longitudinal direction. An automatic belt mechanism is attached via a fastening, such as a screw connection, at a connecting region between a lower end portion of a body pillar and the associated side sill. An outlet opening for a belt strap of the automatic belt mechanism is formed on the lower end portion of the body pillar, the outlet opening being directed toward an interior of the passenger cell.

It is the object of the invention to provide a motor vehicle in which a fastening of a lower end portion of a body pillar to a side sill is simplified.

This and other objects are achieved by a motor vehicle in accordance with embodiments of the invention.

A motor vehicle according to the invention is provided with a body which has a passenger cell with laterally arranged body pillars. The respective body pillars are connected to one another at their respective lower end region via a sill which is designed as a longitudinal member. The respective body pillar has an outer profile and, connected thereto, an inner profile for forming a (body pillar) hollow profile. The inner profile of at least one body pillar has a through-opening which serves for guiding through a belt strap of an automatic belt mechanism. The sill has an outer profile and, connected thereto, an inner profile for forming a (sill) hollow profile. At least one reinforcing profile is arranged in the cavity of the (sill) hollow profile.

The through-opening of the inner profile of the body pillar for guiding through the belt strap is advantageously peripherally closed at the end portion of said pillar that points toward the inner profile of the sill by means of a fastening portion. The fastening portion is adjoined by a left side portion and a right side portion. These three portions are fastened to a flange portion of the inner profile of the sill and form a covering surface consisting of two sheet-metal portions which are connected to one another.

The passenger cell advantageously has two side walls which are spaced apart from one another in the vehicle transverse direction. At least one door cutout opening is formed in the respective side wall. The respective door cutout opening is delimited by a front and rear body pillar as seen in the vehicle longitudinal direction.

In one advantageous embodiment, depressions or the like are formed in the side portions of the inner profile of the body pillar and result in a defined deformation of the side portions under the effect of a load from outside or from inside.

A (deformation or crash) depression is advantageously a bead which extends approximately in the vertical direction in a side portion of the (body) inner profile next to the through-opening for the belt strap. In another advantageous embodiment, a step-shaped design of a side portion results next to the through-opening for the belt strap by the formation of at least one depression.

A fastening flange is advantageously formed below the fastening portion of the inner profile of the body pillar, in which portion the automatic belt mechanism is fastened via fasteners, and is fastened to a fastening flange of a reinforcing profile which is arranged in a cavity of the sill.

The covering region with a fastening arrangement of two sheet-metal portions is advantageously adjoined downwardly in the vertical direction by a fastening arrangement of three metal sheets which are connected to one another. The fastening arrangement of three metal sheets consists of the fastening flange of the reinforcing profile, the fastening flange, connected thereto, of the inner profile of the body pillar, and an inner surface, adjacent thereto, of the inner profile of the sill.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
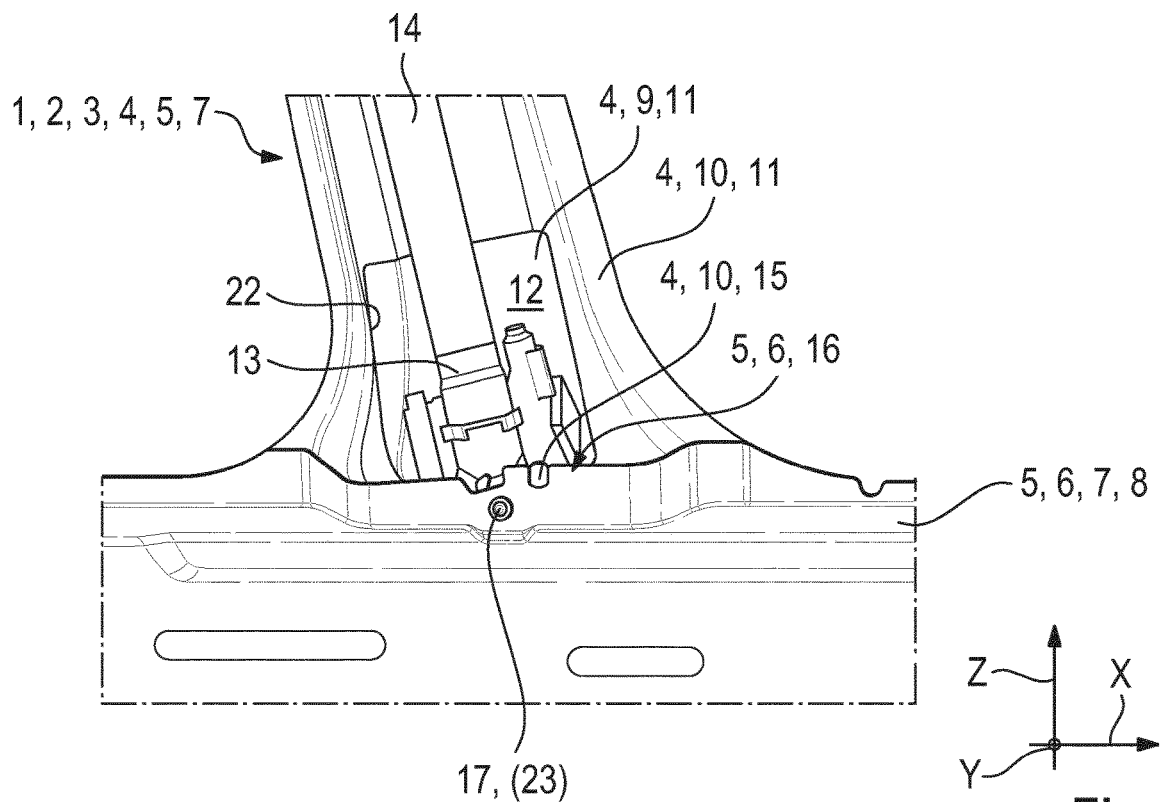
FIG. 1 is a perspective illustration of a fastening of a lower end portion of a body pillar to a side sill.

FIG. 1 shows a portion of a lower end region 3 of a body pillar 4 which is connected to an inner profile 5 of a sill 6 which is designed as a longitudinal member. The body pillar 4 and the sill 6 are constituent parts of a passenger cell 7 (not shown further) of a body 2 of a motor vehicle 1. The inner profile 5 of the sill 6 points into an interior 8 which is surrounded by the passenger cell 7.

In the embodiment shown, the body pillar 4 has an outer profile 9 and an inner profile 10. The outer profile 9 is interconnected with the inner profile 10, for example via flanges, to form a hollow profile 11 with a cavity 12. The cavity 12 has arranged therein, for example, an automatic belt mechanism 13 with a winding device for a belt strap 14.

The automatic belt mechanism 13 is fastened to a lower portion 15 of the inner profile 10 of the body pillar 4 and to a flange portion 16, connected thereto, of the inner profile 5 of the sill 6 via a fastener 17. In the fastened state, the automatic belt mechanism 13 is arranged on an inner surface, directed toward the surroundings, of a fastening portion 20 of the inner profile 10. The fastener 17 can be a screw connection or the like, for example.

Figure 2:
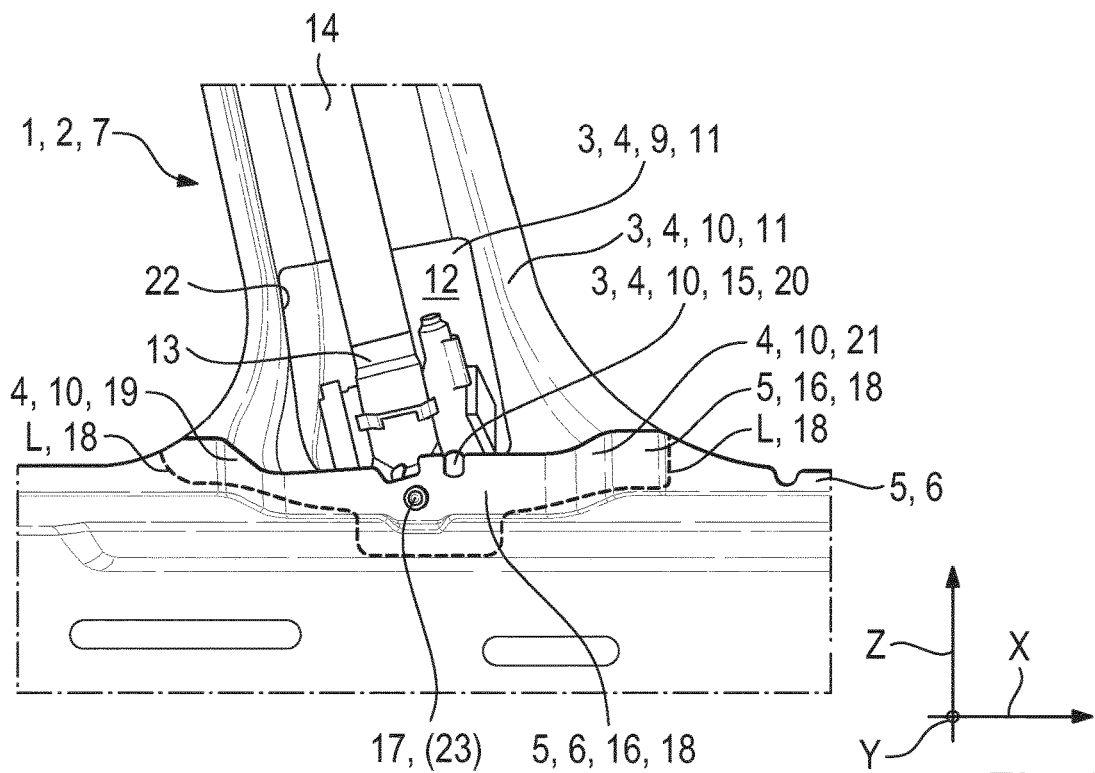
FIG. 2 is a perspective illustration corresponding to FIG. 1, with FIG. 2 additionally indicating by a dashed line a region in which a fastening surface of the lower end portion of the body pillar is connected to a fastening surface of a profile of the side sill.

FIG. 2 differs from FIG. 1 in that a dashed line L reveals a covering surface 18 between the lower portion 15 of the inner profile 10 of the body pillar 4 and the flange portion 16 of the inner profile 5 of the sill 6.

The covering surface 18 extends from a left side portion 19 of the inner profile 10 of the body pillar 4 via a fastening portion 20 of the inner profile 10 for holding the automatic belt mechanism 13 up to the right side portion 21 of the inner profile 10 of the body pillar 4 and the flange portion 16, which is opposite thereto, of the inner profile 5 of the sill 6.

Figure 3:
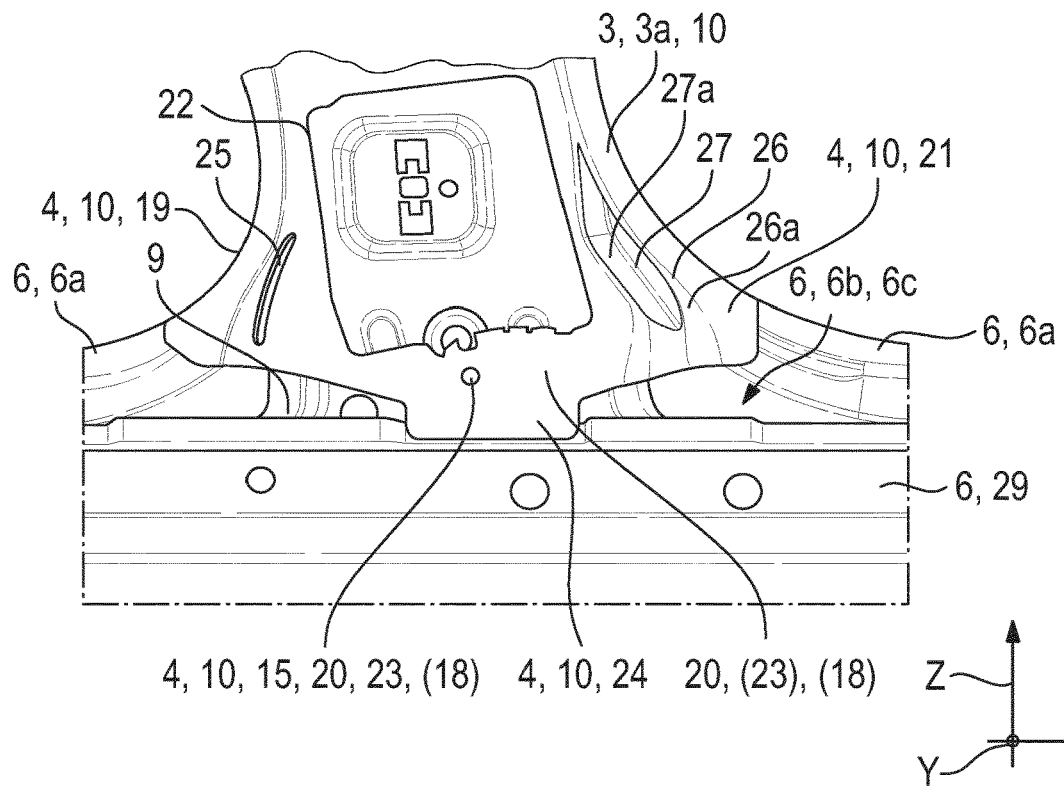
FIG. 3 is a perspective illustration corresponding to FIGS. 1 and 2, with FIG. 3 making visible a fastening of a fastening portion of the lower end of the body pillar to a reinforcing longitudinal member which is arranged in a cavity of the side sill.

FIG. 3 illustrates an end portion 3a of the inner profile 10 of the body pillar 4. The end portion 3a of the inner profile 10 has a through-opening 22 from which the belt strap 14 of the automatic belt mechanism 13 can exit. FIG. 3 also illustrates the left side portion 19, the fastening portion 20 with a through-opening 23 for the fastener 17, and the right side portion 21. An approximately rectangular fastening flange 24 is formed below the through-opening 23 in the fastening portion 20 of the inner profile 10.

FIG. 3 shows certain portions of the outer profile 9 of the body pillar 4. Behind the outer profile 9 of the body pillar 4 there extends an outer profile 6a of the sill 6. The outer profile 6a of the sill 6 forms, with the inner profile 5 of the sill 6, a cavity 6b of a hollow profile 6c. A reinforcing profile 29 is arranged in the cavity 6b of the hollow profile 6c.

A bead 25 which extends upwardly in the vertical direction z is formed on the left side portion 19. Two obliquely extending depressions 26, 27 are formed on the right side portion 21 of the inner profile 10, and therefore two steps 26a and 27a result. The bead 25 and the depressions 26, 27 serve to ensure a defined deformation by folding, bending or the like under the effect of a force from outside.

Figure 4:
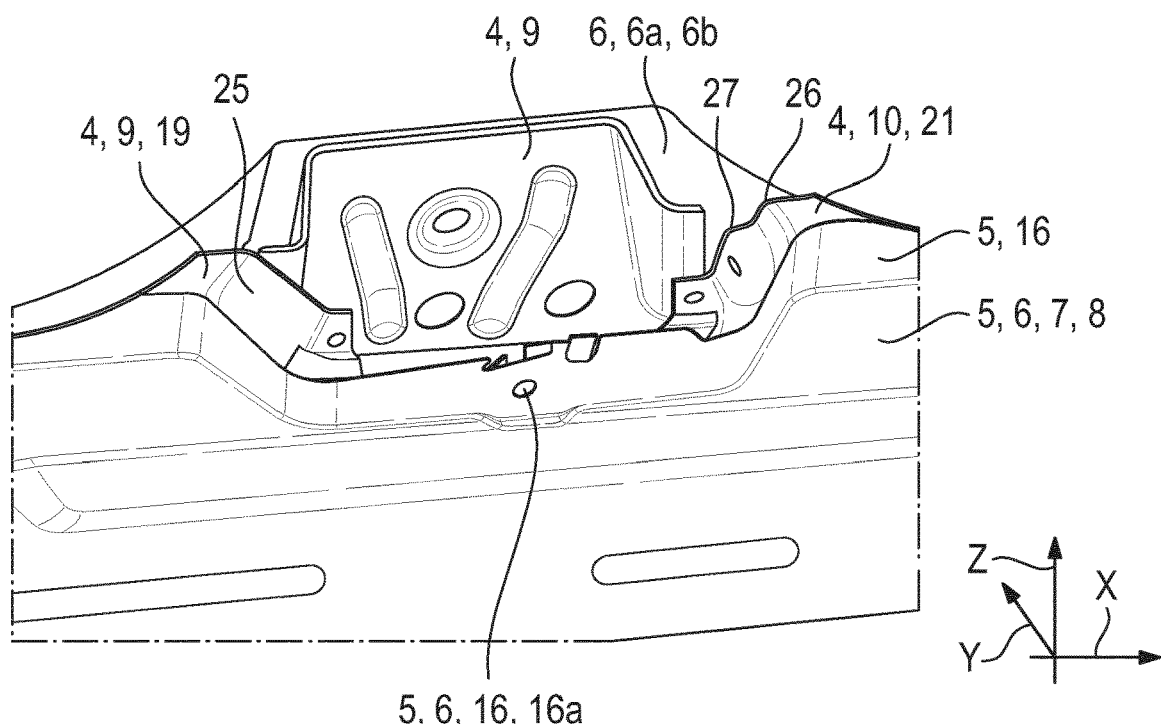
FIG. 4 is a perspective sectional illustration of FIG. 1 from which there emerges a cross section of a bead on a left side portion of the inner body pillar profile and in which there is illustrated a step-shaped gradation of a cross section of the right side portion of the inner body pillar profile.

FIG. 4 illustrates the cross section of the bead 25 which is formed in the left side portion 19 of the end portion 3a of the inner profile 10. The depressions 26 and 27 and the resulting steps 26a and 27a can be seen on the right side portion 21 of the end portion 3a of the inner profile 10. FIG. 4 also illustrates a through-opening 16a in the flange portion of the inner profile 5 of the sill 6 for the fastener 17.

Figure 5:
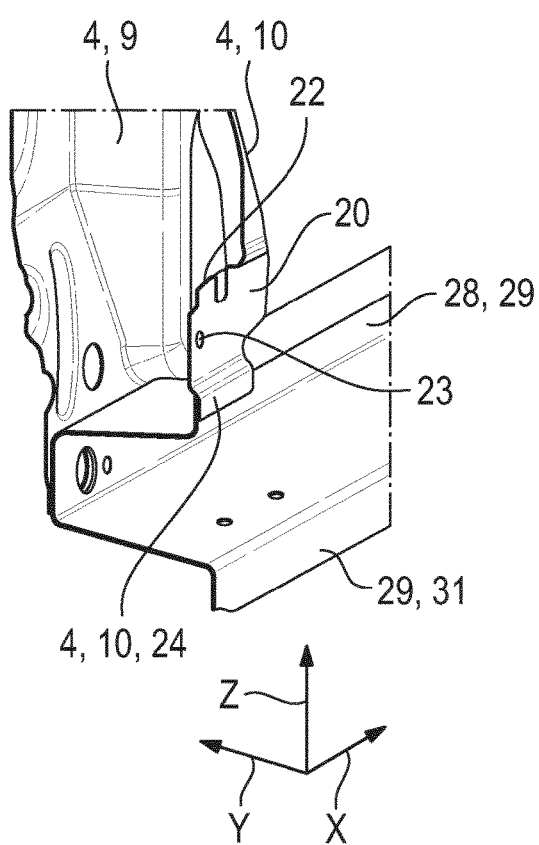
FIG. 5 is a cross section through the fastening region shown in FIG. 3, which shows the connection of the lower fastening portion of an end portion of an inner profile of the body pillar to a flange of a reinforcing profile which is arranged in the side sill.

FIG. 5 shows a section in FIG. 3. The section extends in a plane in the vertical direction z and in the vehicle traverse direction y in the vicinity of the through-opening 23 for the fastener 17. The fastening flange 24 of the body pillar inner profile 10 is fastened to a fastening flange 28 of the substantially V-shaped reinforcing profile 29.

The reinforcing profile 29 is arranged in the cavity 6b which is formed in the sill 6 and which is covered toward the interior 8 of the passenger cell 7 by the inner profile 5. The reinforcing profile 29 is connected to an inner surface 32 of the inner profile 5 via the upper fastening flange 28 and a lower fastening flange 31, as is illustrated in the sectional illustration of FIG. 6.

Figure 6:
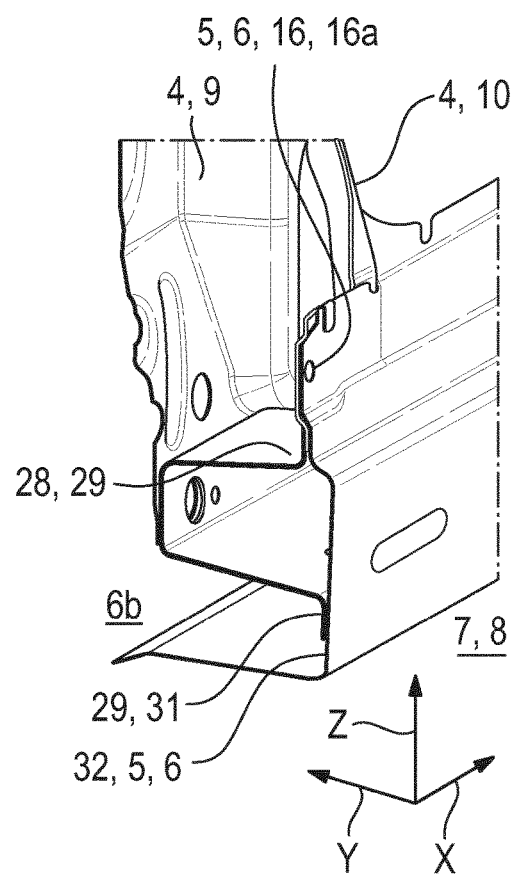
FIG. 6 is a cross-sectional view of the fastening region shown in FIG. 1, in which there is shown, in addition to the cross section shown in FIG. 5, the fastening of the inner (side sill) reinforcing profile to the lower end portion of the inner body pillar profile.
Figure 7:
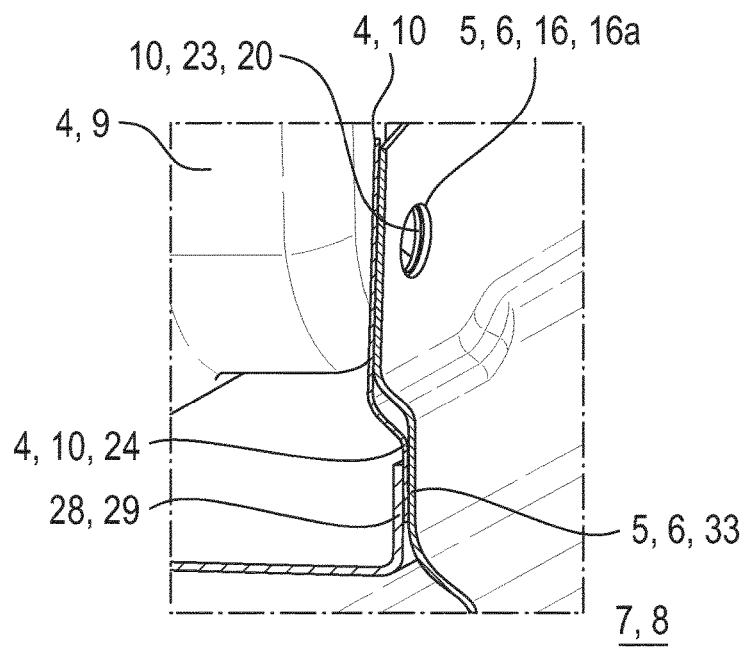
FIG. 7 is an enlarged illustration of FIG. 6, with FIG. 7 showing the covering surface between the fastening portion of the inner profile of the body pillar and the flange portion of the inner profile of the sill.

FIG. 7 shows an enlarged illustration of FIG. 6, which shows the covering surface 18 between the fastening portion 20 of the inner profile 10 of the body pillar 4 and the flange portion 16 of the inner profile 5 of the sill 6. This covering surface 18 with two interconnected metal sheets 20, 16 lying against one another is adjoined by a fastening portion on which three metal sheets 28, 24, 33 are interconnected.

The three interconnected metal sheets 28, 24, 33 are, from outside to inside in the direction of the interior 8 of the passenger cell 7, the upper fastening flange 28 of the reinforcing profile 29 of the sill 6, the fastening flange 24, connected thereto, of the inner profile 10 of the body pillar 4, and a fastening portion 33, situated opposite thereto, of the inner profile 5 of the sill 6.

By virtue of doubling the fastening region for the automatic belt mechanism 13 at the level of the through-opening 23 by means of the fastening portion 20 of the body pillar 4 and the flange portion 16, situated opposite thereto, of the inner profile 5 of the sill 6, there is obtained an integrated reinforcement which allows higher load transfer or force transfer and which renders additional reinforcing components superfluous. The attachment of the inner profile 10 of the body pillar 4 to the reinforcing profile 29 via the fastening flange 24 increases the stiffness of the attachment of the end region 3 of the body pillar 4 to the sill 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A motor vehicle, comprising:
a body having a passenger cell with laterally arranged body pillars;
a sill configured as a longitudinal member, wherein respective ones of the body pillars are connected to one another at their respective lower end regions via the sill,
a respective body pillar has an outer profile and, connected thereto, an inner profile for forming a hollow profile,
the inner profile of at least one body pillar has a through-opening, said through-opening serving to guide through a belt strap of an automatic belt mechanism,
the sill has an outer profile and, connected thereto, an inner profile for forming a hollow sill profile,
at least one reinforcing profile is arranged in a cavity of the hollow sill profile,
the through-opening of the inner profile of the body pillar that guides through the belt strap is closed at an end portion of said body pillar that points toward the inner profile of the sill via a fastening portion of the inner profile of the body pillar, the fastening portion of the inner profile of the body pillar is adjoined by a left side portion of the inner profile of the body pillar and a right side portion of the inner profile of the body pillar, the fastening portion, the left side portion and the right side portion of the inner profile of the body pillar are fastened to a flange portion of the inner profile of the sill and form a covering surface consisting essentially of two sheet-metal portions connected to one another;

wherein the automatic belt mechanism is fastened to the fastening portion of the inner profile of the body pillar and the flange portion of the inner profile of the sill via a fastener.

2. The motor vehicle as claimed in claim 1, wherein the passenger cell has two side walls which are spaced apart from one another in the vehicle transverse direction y, at least one door cutout opening is formed in the respective side wall, and the respective door cutout opening is delimited by a front and rear body pillar as seen in the vehicle longitudinal direction x.

3. The motor vehicle as claimed in claim 1, wherein at least one geometric formation is formed in at least one side portion of the inner profile of the body pillar and results in a defined deformation of the relevant side portion under an effect of a load from outside or from inside.

4. The motor vehicle as claimed in claim 3, wherein a geometric formation is a depression in the form of a bead which extends approximately in the vertical direction in a side portion of the inner profile next to the through-opening for the belt strap.

5. The motor vehicle as claimed in claim 4, wherein a geometric formation is at least one depression which is formed in a side portion next to the through-opening for the belt strap and which results in a step-shaped design of the side portion next to the through-opening for the belt strap.

6. The motor vehicle as claimed in claim 3, wherein a geometric formation is at least one depression which is formed in a side portion next to the through-opening for the belt strap and which results in a step-shaped design of the side portion next to the through-opening for the belt strap.

7. The motor vehicle as claimed in claim 1, wherein a fastening flange is formed below the fastening portion of the inner profile of the body pillar, in which portion the automatic belt mechanism is fastened via the fastener, and is fastened to a fastening flange of a reinforcing profile which is arranged in a cavity of the sill.

8. A motor vehicle, comprising:

a body having a passenger cell with laterally arranged body pillars;

a sill configured as a longitudinal member, wherein respective ones of the body pillars are connected to one another at their respective lower end regions via the sill, a respective body pillar has an outer profile and, connected thereto, an inner profile for forming a hollow profile, the inner profile of at least one body pillar has a through-opening, said through-opening serving to guide through a belt strap of an automatic belt mechanism, the sill has an outer profile and, connected thereto, an inner profile for forming a hollow sill profile, at least one reinforcing profile is arranged in a cavity of the hollow sill profile, the through-opening of the inner profile of the body pillar that guides through the belt strap is closed at an end portion of said body pillar that points toward the inner profile of the sill via a fastening portion, the fastening portion is adjoined by a left side portion and a right side portion, the fastening portion, the left side portion and the right side portion are fastened to a flange portion of the inner profile of the sill and form a covering surface consisting essentially of two sheet-metal portions connected to one another;

wherein the covering region with a fastening arrangement of two sheet-metal portions is adjoined downwardly in the vertical direction z by a fastening arrangement of three metal sheets which are connected to one another, and the fastening arrangement of three metal sheets consists essentially of the fastening flange of the reinforcing profile, the fastening flange, connected thereto, of the inner profile of the body pillar, and an inner surface, adjacent thereto, of the inner profile of the sill.

* * * * *